UNITED STATES PATENT OFFICE.

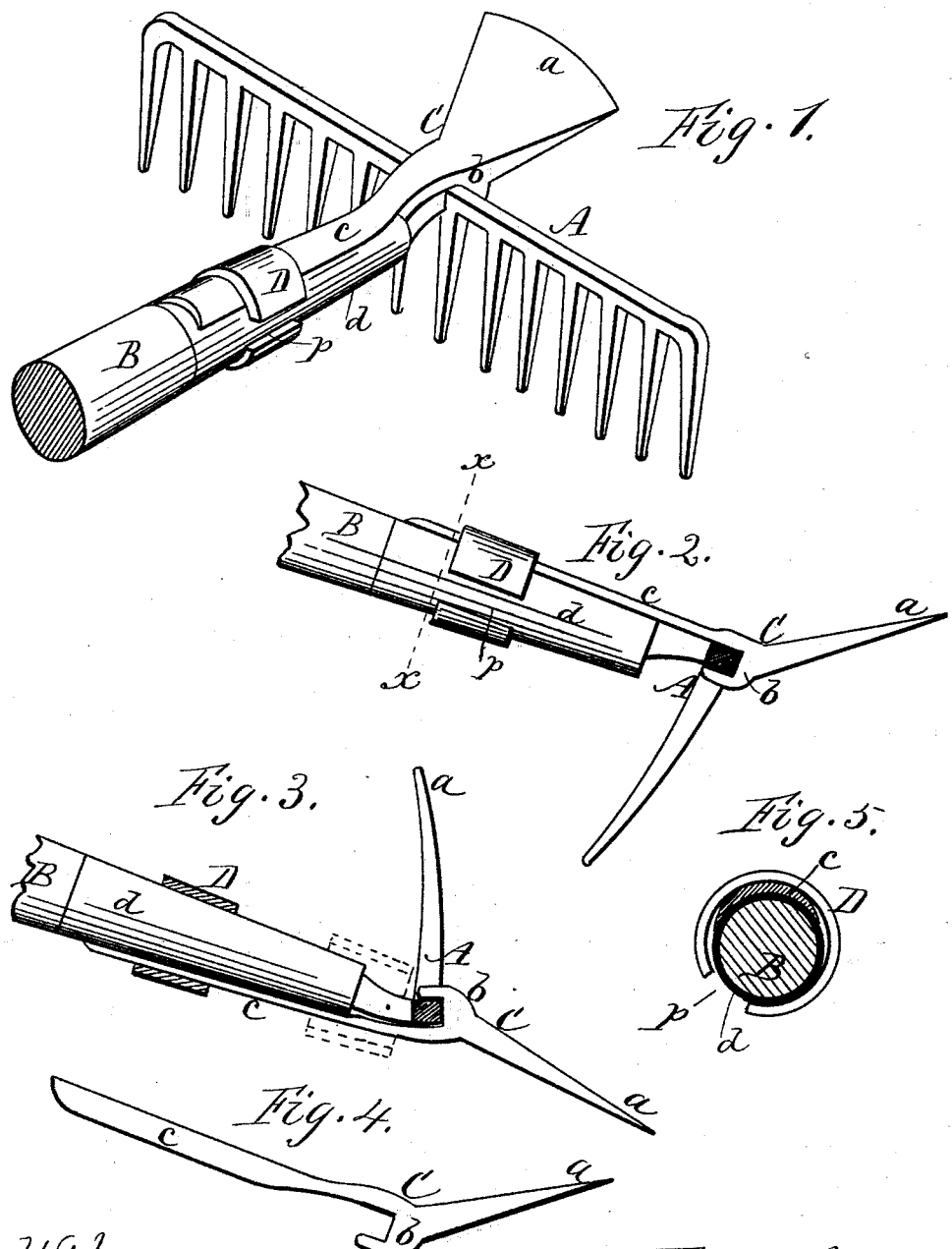

WILLIAM T. GALLT, OF PORT BYRON, NEW YORK.

RAKE.

SPECIFICATION forming part of Letters Patent No. 498,007, dated May 23, 1893.

Application filed July 19, 1892. Serial No. 440,474. (No model.)

*To all whom it may concern:*

Be it known that I, WILLIAM T. GALLT, of Port Byron, Cayuga county, State of New York, have invented a certain new and useful Improvement in Attachments for Rakes; and I do hereby declare that the following is a full, clear, and exact description of the same, reference being had to the accompanying drawings, in which—

Figure 1 is a perspective view of the rake with the attachment applied. Fig. 2 is a side elevation, partially in section of the same right side up. Fig. 3 is a similar view of the device turned bottom upward. Fig. 4 is a side elevation of the spud or cutter detached. Fig. 5 is an enlarged cross section on line $xx$ of Fig. 2.

My improvement relates to attachments for lawn and garden rakes made with metal heads, and consists of a removable spud or cutter attached to the head of the rake and secured by suitable means, as hereinafter described.

In the drawings A indicates the head, and B the handle, of an ordinary lawn or garden rake, the head being made of metal as usual.

C is the spud or cutter which forms the subject of my invention. It is made of steel or other hard metal, and consists of a blade $a$, sharp-edged at its outer end to form a cutter, an open socket $b$, which fits the rake head, and a thin shank $c$ made concave on its under side and fitting the tapering ferrule $d$, which usually covers the end of the handle and incloses the shank of the rake head. The socket $b$ of the spud is of square form, and is open on the back side and forms a hook which is hooked over the head of the rake, the shank of the spud then lying flat upon the ferrule of the handle. The shank of the attachment is made either straight or curved to fit rake heads having corresponding straight or curved shanks, as the case may be.

D is a collar or ring of somewhat tapering form to fit the taper of the ferrule. This collar slips over the end of the handle, covering the shank of the spud, and when forced back tightly it draws the spud up closely against the head of the rake and binds the shank down fast to the handle. In this condition the spud is a solid attachment to the rake head, and by turning the rake over into the position shown in Fig. 3, that is, inverted—it can be used as a cutter to cut weeds, roots, sticks, &c., the handle being held in the hands and pushed endwise for the purpose. In such use the resistance comes against the outside of the rake head, the socket of the spud inclosing it on that side, hence the spud will be self tightening. The spud stands in line with the handle, hence the great strain comes upon the handle and not on the rake head one side of the handle.

The spud may be used upon the rake at all times when it may be necessary to cut obstructions; but when it is desired to use the flat head of the rake, for smoothing beds, lawns, &c., or other purposes, the spud can be detached by simply slipping the ferrule D, down to the lower end of the handle, as shown in dotted lines Fig. 3, thereby releasing the shank and allowing the spud to be slipped off leaving the rake in its ordinary condition. Under ordinary circumstances the collar will retain its place on the tapering ferrule and hold the spud firmly in place; but if desired set screws, or other means, may be used to secure the spud in place. The blade of the spud may be made of the triangular shape shown, or any other shape which will best answer the purpose. This spud differs from a hoe on the back of the rake, inasmuch as it stands at such an angle as to be used as a punch by making an end thrust of the handle, and by being detachable at pleasure.

The spud constructed as above described can be made and put on the market as a separate article of manufacture adapted to be attached to a rake head or handle by any person without trouble. The collar D is slotted or made open on one side, as shown at $p$, by which means it can be attached without removing the head of the rake. It is done by slipping it over the shank or smaller end of the ferrule and then sliding it back on the ferrule.

I do not claim simply and broadly a detachable cutter for rakes; but,

Having described my invention, what I claim as new, and desire to secure by Letters Patent, is—

1. The combination, with a metallic rake head, of a spud consisting of a cutter, an open socket which fits the rake head and a shank which fits the end of the handle, and suitable means for securing the spud in place, as specified.

2. The combination, with a metallic rake head, of a spud having a cutter, an open socket which fits the rake head, and a shank which fits the end of the handle, and a sliding collar which secures the shank to the handle, as herein shown and described.

3. The attachment herein described, consisting of the thin shank $c$ adapted to fit the handle of the rake, the open socket $b$ adapted to fit the rake head and embrace the under side thereof, and the blade $a$ standing at an obtuse angle to the shank, as and for the purpose specified.

In witness whereof I have hereunto signed my name in the presence of two subscribing witnesses.

WM. T. GALLT.

Witnesses:
JOHN H. ELDRIDGE,
W. P. STILWELL.